United States Patent [19]

Kohno

[11] Patent Number: 4,737,848
[45] Date of Patent: Apr. 12, 1988

[54] DRIVING APPARATUS FOR CHARGE-COUPLED IMAGE SENSOR PRODUCING CONTROLLED TRANSFER PULSES

[75] Inventor: Akiyoshi Kohno, Tokyo, Japan

[73] Assignee: NEC Corporation, Tokyo, Japan

[21] Appl. No.: 639,388

[22] Filed: Aug. 10, 1984

[30] Foreign Application Priority Data

Aug. 11, 1983 [JP] Japan .............................. 58-146930

[51] Int. Cl.$^4$ .............................................. H04N 5/04
[52] U.S. Cl. ................................ 358/148; 358/213.29
[58] Field of Search ............... 358/212, 213, 148, 160, 358/140, 241, 151, 158, 320, 337, 213.26, 213.29, 213.31

[56] References Cited

U.S. PATENT DOCUMENTS 4,001,498  1/1977  Morishita et al. .................. 358/160
4,455,574  6/1984  Hashimoto et al. ................ 358/213

FOREIGN PATENT DOCUMENTS 0097324  8/1979  Japan .................................. 358/213
0085173  6/1980  Japan .................................. 358/213

Primary Examiner—James J. Groody
Assistant Examiner—David E. Harvey
Attorney, Agent, or Firm—Burns, Doane, Swecker & Mathis

[57] ABSTRACT

The driving system of an image sensor produces a phase controlled transfer pulses and comprises a horizontal scanning signal generator, a reference pulse producer producing a reference pulse from a horizontal scanning signal, the reference pulse being transferred through the horizontal charge transfer section of the image sensor, a comparator comparing the transferred reference pulse with the horizontal scanning signal, and a voltage controlled oscillator producing transfer pulses in accordance with the result of the comparison. The application of the transfer pulses to the horizontal charge transfer section is controlled by using a keying controlled oscillator as the volage controlled oscillator or using a gate connected after the voltage controlled oscillator.

7 Claims, 2 Drawing Sheets

DRIVING APPARATUS FOR CHARGE-COUPLED IMAGE SENSOR PRODUCING CONTROLLED TRANSFER PULSES

BACKGROUND OF THE INVENTION

1. Field of the Invention

The present invention relates to a driving apparatus for charge-coupled (hereinafter, a charge-coupled device is referred to as a CCD) image sensor, and more particularly to a system for precisely controlling the repetition frequency of transfer pulses.

2. Description of the Prior Art

The great part of the solid-state image sensors such as an interline type CCD area image sensor have a selected number of imaging elements in a horizontal line. Such selected number is suitable to be driven by the frequency which is integer times of the color subcarrier frequency in the NTSC color system. Typically, the driving frequency or the repetition frequency of charge transfer pulses is 7.16 MHz which is just double of the color subcarrier frequency which is 3.58 MHz. The number of the imaging elements in a horizontal line is 380. The main reasons of the selection of such driving frequency and the imaging element number are three technical factors. First, the present manufacturing limit of imaging element number is about four hundreds in a horizontal line. Second, the frequency of the reference signal in standard sync signal generator is 14.32 MHz, nowadays, which is easily divided to produce the driving frequency of 7.16 MHz by one frequency divider. Last, because the noise frequency generated from the one frequency divider is same as the reference frequency, the most harmful synchronous noise is not introduced into the driving apparatus of the CCD image sensor.

On the other hand, the reproduced picture picked up by the image sensor having 380 imaging elements in a horizontal line is not sufficient in views of resolusion and spurious image. Therefore, in order to reproduce a fine picture compatible with the image obtained by camera tubes, the increment of imaging element number is expected. However, so long as the frequency of the integer times of the color subcarrier frequency is employed as the driving frequency, the imaging element number should be sharply increased to the number such as 570 which is one and half times of 380 and 760 which is two times. Such sharp increment is very difficult in view of the present techniques.

However, if the driving frequency can be controlled to fit the increment of imaging element number, the element number can be increased without restraint. Measurement for controlling driving frequency, more particularly the phase of the driving frequency is a usage of a Phase-Locked-Loop (PLL) circuit or a keying controlled oscillator. The PLL circuit uses a serially connected frequency dividers, resulted in a generation of synchronous noises harmful for the reproduced picture. The keying controlled oscillator is unstable for variations in temperature and voltage, resulted in a vibration of reproduced picture.

SUMMARY OF THE INVENTION

The primary object of the present invention is to provide a driving system of CCD image sensor in which the driving frequency and its phase are precisely controlled.

The driving system of CCD image sensor according to the present invention includes a generator of a horizontal scanning signal, a first circuit for producing reference pulses from the horizontal scanning signal, a second circuit for inputing the reference pulses to the horizontal charge transfer line of the CCD image sensor, a comparator comparing the reference pulse obtained after the transfer through the horizontal charge transfer line with the horizontal scanning signal and producing a D.C. voltage in accordance with the comparison, a voltage controlled oscillator receiving the D.C. voltage and driving a transfur signal to be applied to the image sensor in accordance with the D.C. voltage, and a third circuit for applying the transfer signal to the horizontal charge transfer line of the CCD image sensor.

According to the driving system of the present invention, the phase of the reference pulse transferred through the horizontal charge transfer line is compared with the horizontal scanning signal and the phase of the transfer signal is controlled by the result of the comparison. The phase of the transfer signal is always fit to drive the horizontal charge transfer line. Even if the number of transfer stages in the horizontal line is not the number of integer times of half of 380, the phase condition of the transfer signal is kept correct. Therefore, the imaging element number in a horizontal line can be arbitrarily determined.

Further, according to the driving system of the present invention, no frequency divider is used, resulted in a generation of no synchronous noise. The transfer signal is stable as the horizontal scanning signal. If the horizontal scanning signal is generated by way of a crystal oscillator, the horizontal scanning signal is very stable. The reproduced picture picked up with the use of the driving system of the present invention is very stable without vibration of image.

BRIEF DESCRIPTION OF THE DRAWING

The above-mentioned and other objects and features of the present invention will become more apparent from the following description taken in conjunction with the accompanying drawings; wherein.

DESCRIPTION OF THE PREFERRED EMBODIMENT

Figure 1:
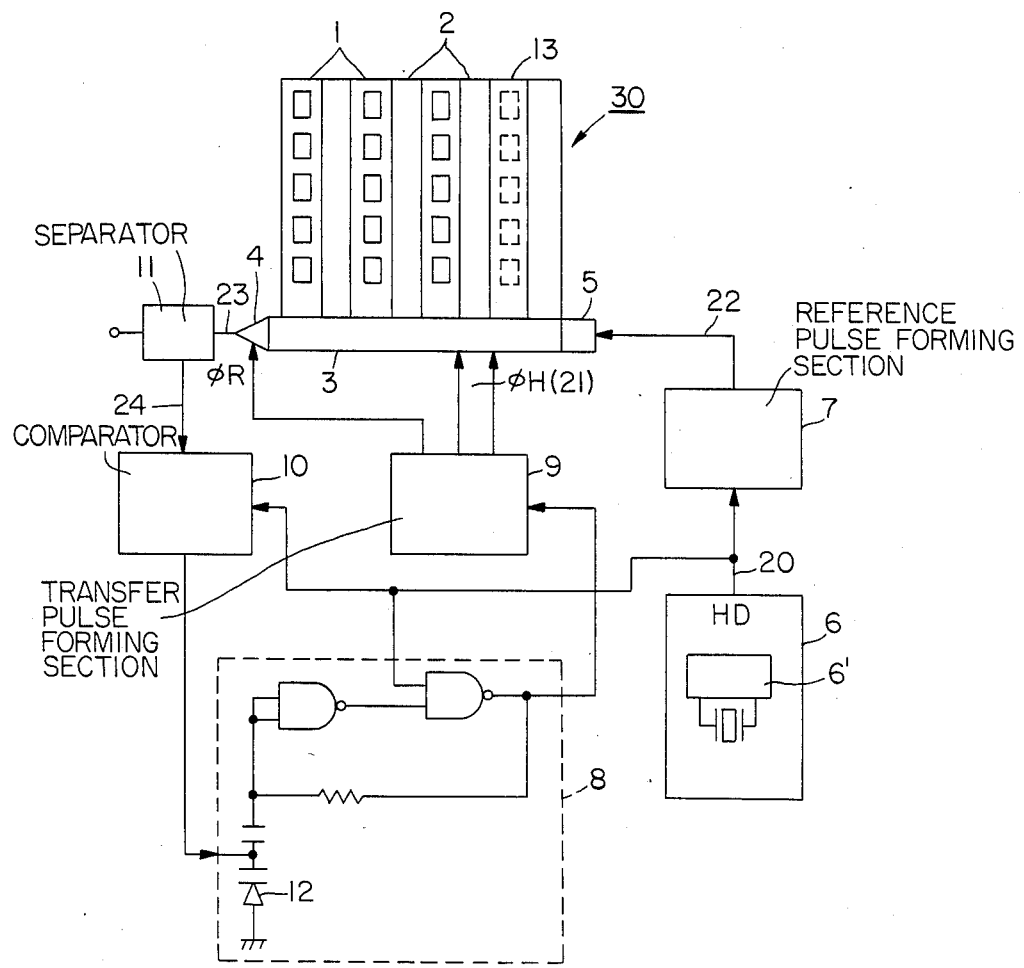
FIG. 1 is a circuit block diagram of the driving system according to the preferred embodiment of the present invention.
Figure 2:
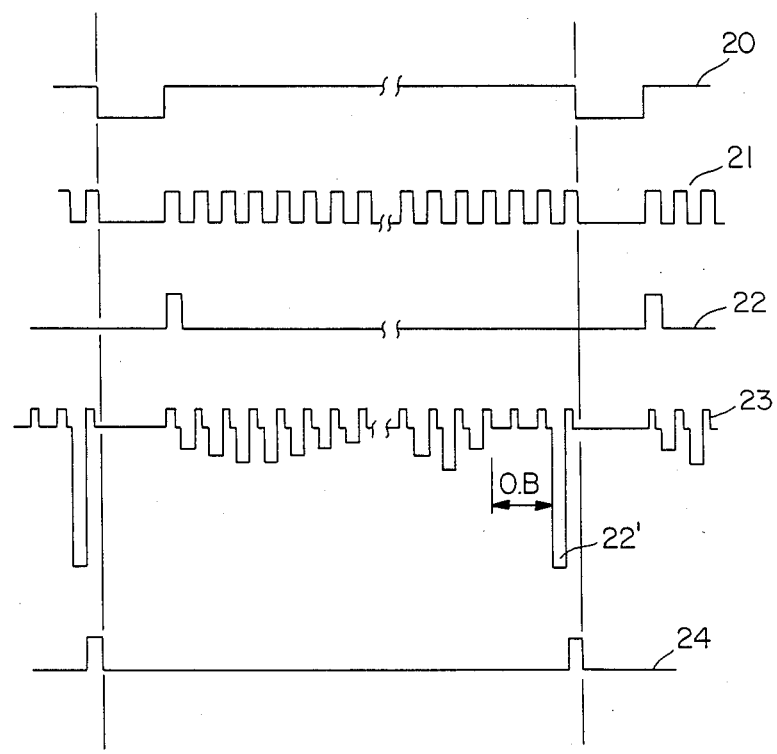
FIG. 2 is a diagram of waveforms obtained at the various points of the preferred embodiment shown in FIG. 1.

An interline type CCD area image sensor 30 has vertital lines of imaging elements 1, vertical charge transfer lines 2 disposed in parallel with the respective vertical lines of imaging elements 1, a horizontal charge transfer line 3 having a charge input section 5 and a charge output section 4 and an optical black section 13 including a line of light-shielded imaging elements and light-shielded vertical charge transfer line. Although the example of the number of vertical charge transfer lines 2 is 380, the number may be arbitrarily selected. Charges accumulated in the imaging elements 1 are transferred to the vertical charge transfer lines 2 in a vertical blanking period and then transferred to the horizontal charge transfer line 3. In one horizontal scanning period, the horizontal charge transfer line 3 receives the charges accumulated in one imaging element 1 from the respective vertical lines and transferred to the output section 4 with the aid of transfer pulses $\phi_H$ (21) applied from the transfer pulse forming section 9. The transfer pulse forming section 9 also generates the reset pulse $\phi_R$. The transfer pulses $\phi_H$ (21) and the reset pulse $\phi_R$ are produced from the output from the keying controlled oscillator 8 of which output frequency is controlled by a D.C. voltage applied to a varactor diode 12. The keying controlled oscillator 8 is made of cascade connected NAND gates, a feed-back resistor and a series circuit of a capacitor and the varactor diode 12. The oscillation 8 is keying controlled by receiving a horizontal synchronizing signal HD (20) from the synchronizing signal generator 6. In other words, the oscillator 8 oscillates to produce the transfer pulses $\phi_H$ (21) in the period when the horizontal synchronizing signal 20 has a high level. The low level period of the horizontal synchronizing signal HD (20) corresponds to the horizontal blanking period.

The synchronizing signal generator 6 includes a reference signal oscillator 6' using a crystal oscillator of 14.32 MHz which is four times of the color subcarrier frequency. From the reference signal of 14.32 MHz horizontal synchronizing signal HD (20) is produced. The obtained horizontal synchronizing signal HD (20) is applied to a reference pulse forming section 7 which produces the reference pulse 22 in accordance with the rise of the horizontal synchronizing signal HD (20). The reference pulse 22 is introduced into the horizontal charge transfer line 3 from the input section 5 and transferred along the transfer line 3 together with the charges sent from the vertical lines of imaging elements 1. After the transfer through the transfer line 3, the reference pulse 22' is derived from the output section 4 and separated from other signal in the separator section 11. In the separator section 11, the separated reference pulse 22' is also subjected to a necessary time delay and a necessary voltage adjustment to form a reference pulse comparison signal 24. The comparison signal 24 is compared with the horizontal synchronizing signal HD (20) in the comparator section 10. As the result of the comparison, a D.C. voltage is obtained in accordance with a time period when the comparison signal 24 and the horizontal synchronizing signal HD (20) simultaneously exist. The D.C. voltage is applied to the varactor diode 12 in the keying controlled oscillator 8 to control the oscillation frequency so that the comparison signal 24 is produced at the trailing edge of the horizontal synchronizing signal HD (20). That is, if the comparison signal 24 overlaps in time the horizontal synchronizing signal HD (20), the oscillation frequency of the keying controlled oscillator 8 is made higher to transfer charges more quickly through the transfer line 3. As a result, the occurrence of the comparison signal is quickened. On the other hand, if the comparison signal 24 is separated in time from the horizontal synchronizing signal HD (20), the frequency of the keying controlled oscillator 8 is lowered to prolong the occurrence of the comparison signal 24.

As the result of the phase comparison and the oscillation frequency control, the transfer pulses $\phi_H$ (21) becomes to have a correct phase such that a leading edge of first pulse and a trailing edge of last pulse are respectively identical to the leading edge and the trailing edge of the horizontal synchronizing signal HD (20). The obtained transfer pulses are very stable. Therefore, the reproduced picture from the image signal picked up with the aid of the driving system of the present invention is very stable without image vibration. The driving system does not use any frequency divider. Any synchronous noise is not generated. Therefore, noise in the reproduced picture is very small. Particularly, the resolution is improved.

An additional merit of the preferred embodiment is based on the optical black section 13. The charges from the optical black section 13 is inserted between the charges from the imaging element 1 and the charges from the input section 5. Therefore, in the output signal (23) from the output section 4, an optical black signal OB positions before the reference pulse 22'. As the result, the reference pulse 22' has a voltage level clearly differentiated from the voltage level of the optical black signal OB, and then is easily separated from other signal in the comparator section 10.

It is most preferable to use a crystal oscillator in the synchronizing signal generator 6, because the signal generated by the crystal oscillator is very stable. If there is any other stable oscillator, it may be replaceable with the crystal oscillator. The keying controlled oscillator 8 is also replaceable with other voltage controlled oscillator. Another modification is to combine a gate and a voltage controlled oscillator in place of the keying controlled oscillator 8. That is, the output from the voltage controlled oscillator is gated by AND gate applied with horizontal synchronizing signal HD (20).

What is claimed is:

1. A driving system of an image sensor having a charge transfer section, comprising a generator of a scanning signal, a means for producing a reference pulse from said scanning signal, a means for inputting said reference pulse to said charge transfer section, a means for deriving said reference pulse from said charge transfer section after being transferred therethrough, a means for subjecting said derived reference pulse to a time delay, a comparator comparing said reference pulse obtained from said time delay subjecting means with said scanning signal to produce an output voltage in accordance with an overlapping time of said reference pulse obtained from said time delay subjecting means and said scanning signal, a voltage controlled oscillator generating charge transfer pulses having a frequency corresponding to said output voltage, and means for applying said charge transfer pulses to said charge transfer section.

2. A driving system of an image sensor as claimed in claim 1, wherein said generator comprises a crystal generator.

3. A driving system of an image sensor as claimed in claim 1, wherein said voltage controlled oscillator is a keying controlled oscillator.

4. A driving system of an image sensor as claimed in claim 2, wherein said voltage controlled oscillator is a keying controlled oscillator.

5. A driving system of an image sensor as claimed in claim 1, wherein said charge transfer section operates as a horizontal charge transfer section for said image sensor and said image sensor comprises an imaging portion including a plurality of vertical lines, each vertical line having a plurality of aligned imaging elements, vertical charge transfer sections each disposed beside the respective vertical lines, an optical black portion including an additional vertical line of light-shielded imaging elements and a light-shielded vertical charge transfer section disposed beside said additional vertical line of light-shielded imaging elements, and said horizontal charge transfer section receiving charges from said vertical charge transfer sections and said light-shielded vertical charge transfer section to transfer said received charges therethrough, said horizontal charge transfer section having a charge input portion connected to said reference pulse inputting means and an output section connected to said reference pulse deriving means.

6. A method for driving an image sensor having a charge transfer section driven by transfer pulses comprising steps of producing a scanning signal, producing a reference pulse from said scanning signal, inputting said reference pulse into said charge transfer section of said image sensor, transferring charges corresponding to said reference pulse, deriving a reference signal from said charges after being transferred through said charge transfer section, subjecting said reference signal to a time delay, and controlling the frequency of said transfer pulses in accordance with said delayed reference signal, said frequency controlling step including the steps of comparing said delayed reference signal and said scanning signal to produce an output voltage in accordance with a timing relationship of said delayed reference signal and said scanning signal, and controlling the frequency of said transfer pulse in accordance with said output voltage.

7. A method for driving an image sensor as claimed in claim 6, wherein said frequency controlling step effects control of the frequency of said transfer pulses by applying said output voltage to a voltage controlled oscillator.

* * * * *